United States Patent
Zhao et al.

(10) Patent No.: US 9,351,212 B2
(45) Date of Patent: May 24, 2016

(54) PLMN SELECTION METHOD, MOBILE TERMINAL, BSC AND CORE NETWORK DEVICE

(71) Applicant: HUAWEI TECHNOLOGIES CO., LTD., Shenzhen, Guangdong (CN)

(72) Inventors: Yang Zhao, Shanghai (CN); Ming Fang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/514,808

(22) Filed: Oct. 15, 2014

(65) Prior Publication Data

US 2015/0031371 A1  Jan. 29, 2015

Related U.S. Application Data

(63) Continuation of application No. PCT/CN2013/073530, filed on Mar. 30, 2013.

(30) Foreign Application Priority Data

Apr. 16, 2012  (CN) .......................... 2012 1 0109893

(51) Int. Cl.
- *H04W 36/14* (2009.01)
- *H04W 48/18* (2009.01)
- *H04W 36/00* (2009.01)
- *H04W 8/18* (2009.01)

(52) U.S. Cl.
CPC ............... *H04W 36/14* (2013.01); *H04W 8/18* (2013.01); *H04W 36/0055* (2013.01); *H04W 48/18* (2013.01)

(58) Field of Classification Search
CPC .. H04W 36/08; H04W 36/14; H04W 36/0055
See application file for complete search history.

(56) References Cited

U.S. PATENT DOCUMENTS

| 2006/0073831 | A1 | 4/2006 | Guyot et al. |
| 2014/0274059 | A1* | 9/2014 | Ramle et al. .................. 455/436 |

FOREIGN PATENT DOCUMENTS

| CN | 101040490 | 9/2007 |
| CN | 101061738 | 10/2007 |
| CN | 101646226 | 2/2010 |

(Continued)

OTHER PUBLICATIONS

International Search Report mailed Jul. 11, 2013, in corresponding International Patent Application No. PCT/CN2013/073530.

(Continued)

*Primary Examiner* — Leon Flores
(74) *Attorney, Agent, or Firm* — Staas & Halsey LLP

(57) ABSTRACT

Embodiments of the present invention disclose a public land mobile network PLMN selection method, including: when a mobile terminal is about to hand over from a first cell to a neighboring second cell, selecting, by the mobile terminal, a preferred PLMN after handover to the second cell; and sending, by the mobile terminal, identifier ID information of the preferred PLMN to a base station controller to which the first cell belongs. The embodiments of the present invention further disclose a mobile terminal, a base station controller, and a core network device. By applying the present invention, the PLMN to which the mobile terminal intends to hand over can be determined properly.

6 Claims, 7 Drawing Sheets

(56) References Cited

FOREIGN PATENT DOCUMENTS

| | | |
|---|---|---|
| CN | 102244890 | 11/2011 |
| EP | 2571308 A1 | 3/2013 |
| WO | 2013/064419 A1 | 5/2013 |

OTHER PUBLICATIONS

Extended European Search Report dated Mar. 10, 2015 in corresponding European Patent Application No. 13779075.4.

Nortel Networks, "Backwards Compatibility and Mobility in Network Sharing", TSG-RAN Working Group 3 #45, Shin Yokohama, Japan, Nov. 2004, pp. 1-7.

Ericsson, "Handover control in Shared Networks", 3GPP TSG-RAN WG3 #57, Athens, Greece, Aug. 2007, 3 pp.

Huawei, "Discussion", 3GPP TSG-RAN WG2 Meeting #76, San Francisco, USA, Nov. 2011, pp. 1-4.

"Universal Mobile Telecommunications System (UMTS); LTE; Network sharing; Architecture and functional description (3GPP TS 23.251 version 10.3.0 Release 10)", ETSI TS 123 251, Mar. 2012, 29 pp.

PCT International Search Report dated Jul. 11, 2013 in corresponding International Patent Application No. PCT/CN2013/073530.

"$3^{rd}$ Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 10)", 3GPP TS 48.018, V10.5.0, Mar. 2012, pp. 1-184.

"$3^{rd}$ Generation Partnership Project; Technical Specification Group Services and System Aspects; General Packet Radio Service (GPRS); Service description; Stage 2 (Release 11)", 3GPP TS 23.060, V11.1.0, Mar. 2012, pp. 1-332.

* cited by examiner

PLMN SELECTION METHOD, MOBILE TERMINAL, BSC AND CORE NETWORK DEVICE

CROSS-REFERENCE TO RELATED APPLICATIONS

This application is a continuation of International Application No. PCT/CN2013/073530, filed on Mar. 30, 2013, which claims priority to Chinese Patent Application No. 201210109893.4, filed on Apr. 16, 2012, both of which are hereby incorporated by reference in their entireties.

TECHNICAL FIELD

The present invention relates to the field of mobile communications, and in particular, to a PLMN (Public Land Mobile Network, public land mobile network) selection method, a mobile terminal, a BSC (Base Station Controller, base station controller), and a core network device.

BACKGROUND

A PLMN is a network established and operated by a government or an operator approved by the government, and is intended to provide land mobile communications services to the general public. This network needs to interconnect with a PSTN (Public Switched Telephone Network, public switched telephone network) to form a communications network that covers the whole region or country. In the mainland region of China, common PLMNs include those of China Mobile, China Unicom, and China Telecom.

In the construction process of a cell, a MOCN (Multi-Operator Core Network, multi-operator core network) technology is introduced to maximize sharing of radio resources and reduce operator's costs. A core idea of the MOCN technology is to let the cell be shared by multiple operators, that is, the cell is shared by multiple PLMNs. With the cell being shared by multiple operators, the cell is connected to core network devices of different PLMNs, where the core network devices may be an MSC (Mobile Switching Center, mobile switching center) or an SGSN (Serving GPRS SUPPORT NODE, serving GPRS support node), and the like. On the basis of the MOCN technology, a FULL MOCN technology is developed.

In a FULL MOCN, for a mobile terminal in a connected state, for example, when the mobile terminal is in a Dedicated (dedicated) mode, a Packet Transfer (packet transfer) mode, or a Dual Transfer (dual transfer) mode, if the mobile terminal is handed over from a first cell to a neighboring second cell and the second cell is shared by multiple PLMNs, generally a core network device randomly specifies a PLMN for the mobile terminal for handover, which, however, may cause the mobile terminal to be handed over to an inappropriate PLMN. For example, when the mobile terminal is handed over from the first cell to the neighboring second cell, if the second cell is shared by a PLMN1 and a PLMN2 and a tariff of the mobile terminal of the PLMN1 is lower than a tariff of the PLMN2, the core network device may hand over the mobile terminal to the PLMN2 according to the method in the prior art.

SUMMARY

A technical issue to be solved by embodiments of the present invention is to provide a PLMN selection method, a mobile terminal, a base station controller, and a core network side device to properly determine a PLMN to which the mobile terminal intends to hand over.

Correspondingly, an embodiment of the present invention further provides a PLMN selection method, including:

receiving, by a core network device, a handover request from a base station controller, where the handover request is used to request handover of a mobile terminal from a first cell to a neighboring second cell, where the mobile terminal is in a cell to which the base station controller belongs;

selecting, by the core network device according to subscription attribute information of the mobile terminal, a preferred PLMN of the mobile terminal; and performing, by the core network device, a handover process according to the handover request, and sending ID information of the preferred PLMN of the mobile terminal to a base station controller to which the second cell belongs.

Correspondingly, a computer program product comprising a readable storage medium storing program code thereon for use by a core network device, the program code comprising:

instructions for receiving a handover request from a base station controller, wherein the handover request is used to request handover of a mobile terminal from a first cell to a neighboring second cell, wherein the mobile terminal is in a cell to which the base station controller belongs;

instructions for selecting, according to subscription attribute information of the mobile terminal, a preferred PLMN of the mobile terminal; and instructions for performing a handover process according to the handover request received by the receiving unit, and send the ID information of the preferred PLMN of the mobile terminal to a base station controller to which the second cell belongs.

The following beneficial effects are brought by implementing the embodiments of the present invention:

In the embodiments of the present invention, when a mobile terminal is about to hand over from a first cell to a neighboring second cell, the mobile terminal selects a desired PLMN, and sends ID information of the selected PLMN to a base station controller to which the first cell belongs. In this way, the mobile terminal selecting a PLMN is implemented. Because the PLMN is selected by the mobile terminal, it can be avoided that when the mobile terminal is in a connected state, a core network device hands over the mobile terminal to an inappropriate PLMN, and proper PLMN selection is improved.

Alternatively in the embodiments of the present invention, when the core network device receives a handover request that is used to request handover of the mobile terminal from the first cell to the neighboring second cell, the core network device may select a preferred PLMN for the mobile terminal according to subscription attribute information of the mobile terminal. Although the PLMN is not selected by the mobile terminal in this case, an effect of selecting a preferred PLMN of the mobile terminal is also generated because the core network device selects the PLMN for the mobile terminal according to the subscription attribute of the terminal. That is, it is avoided that when the mobile terminal is in a connected state, the core network device hands over the mobile terminal to an inappropriate PLMN, and proper PLMN selection is improved.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
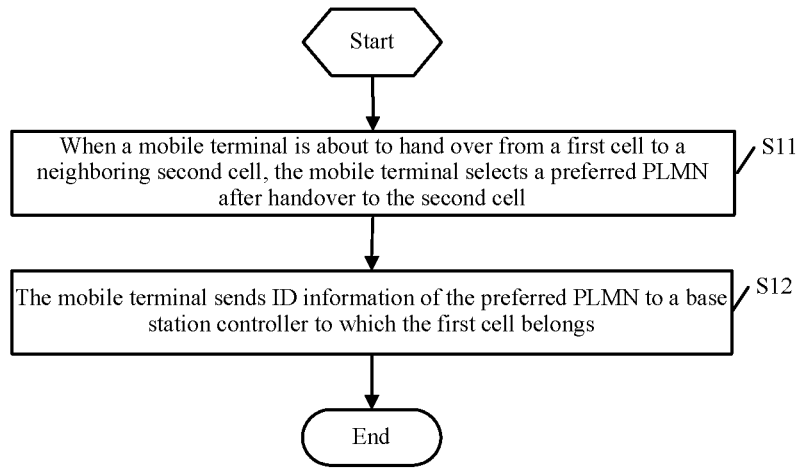
FIG. 1 is a schematic flowchart of a first embodiment of a PLMN selection method according to the present invention.

Refer to FIG. 1, which is a schematic flowchart of a first embodiment of a PLMN selection method according to the present invention.

A method process shown in FIG. 1 may be performed by a mobile terminal, such as a mobile phone, a smartphone, a tablet computer, and the like. The method process shown in FIG. 1 includes the following steps:

Step S11: When a mobile terminal is about to hand over from a first cell to a neighboring second cell, the mobile terminal selects a preferred PLMN after handover to the second cell.

The first cell is a cell to which the mobile terminal currently belongs, and the second cell is a neighboring cell of the first cell. In step S11, when the mobile terminal already learns that the second cell is a shared cell or is uncertain whether the second cell is a shared cell, where the shared cell refers to a cell shared by multiple PLMNs, the mobile terminal may perform the operation of selecting a preferred PLMN after handover to the second cell in step S11.

The preferred PLMN of the mobile terminal may be a home PLMN of the mobile terminal, which is determined by subscription attribute information of the mobile terminal. For example, if the mobile terminal is subscribed to China Mobile, the home PLMN of the mobile terminal is China Mobile. Surely, the preferred PLMN of the mobile terminal may also be a PLMN that is highly dependent on the home PLMN, for example, a PLMN that offers a tariff preference policy. In some implementation manners, assuming that the home PLMN of the mobile terminal is China Mobile but no network signal of China Mobile is available in a current location of the mobile terminal, if the mobile terminal finds that, according to network use records, a Vodafone network is used by the mobile terminal last time and for the last time but one, then the mobile terminal may consider that in this region, Vodafone is a PLMN that is highly dependent on China Mobile, and therefore, the mobile terminal uses Vodafone as a preferred PLMN.

The mobile terminal in step S11 is in a connected state, for example, works in a Dedicated/Packet Transfer/Dual Transfer mode.

Step S12: The mobile terminal sends ID (Identity, identifier) information of the preferred PLMN to a base station controller to which the first cell belongs.

In some implementation manners, the mobile terminal carries the ID information of the preferred PLMN in a measurement report, and sends the measurement report to the base station controller to which the first cell belongs. The measurement report is an important basis for the base station controller to perform a handover decision. Generally, a mobile terminal at a cell edge measures signal strength of a neighboring cell and generates a measurement report, and sends the measurement report to a base station controller to which the corresponding cell belongs. After receiving the measurement report, the base station controller performs a handover decision to determine whether the mobile terminal remains in this cell or hands over to another cell so that the another cell provides services for the mobile terminal. For example, the mobile terminal measures signal strength of neighboring cells of the first cell, that is, a second cell and a third cell, and generates a measurement report, and selects a preferred PLMN if the mobile terminal hands over to the second cell and a preferred PLMN if the mobile terminal hands over to the third cell; and then carries the preferred PLMN in the measurement report and sends the measurement report to the base station controller to which the first cell belongs.

In this embodiment of the present invention, when a mobile terminal is about to hand over from a first cell to a neighboring second cell, the mobile terminal selects a PLMN, and sends ID information of the selected PLMN to a base station controller to which the first cell belongs. In this way, the mobile terminal selecting a PLMN is implemented. Because the PLMN is selected by the mobile terminal, it can be avoided that when the mobile terminal is in a connected state, the core network device hands over the mobile terminal to an inappropriate PLMN, and proper PLMN selection is improved.

Figure 2:
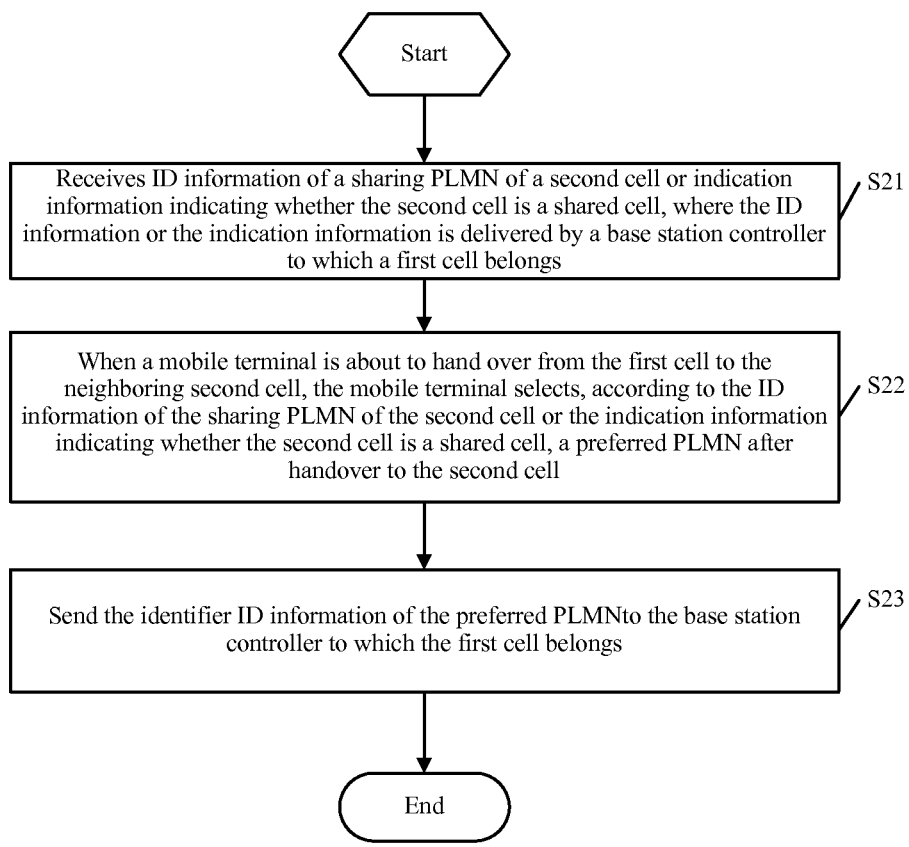
FIG. 2 is a schematic flowchart of a second embodiment of a PLMN selection method according to the present invention.

Refer to FIG. 2, which is a schematic flowchart of a second embodiment of a PLMN selection method according to the present invention. A method process shown in FIG. 2 may also be performed by a mobile terminal. The method process shown in FIG. 2 includes the following steps:

Step S21: A mobile terminal receives ID information of a sharing PLMN of a second cell (when the second cell is a shared cell) or indication information indicating whether the second cell is a shared cell, where the ID information or the indication information is sent by a base station controller to which a first cell belongs.

In some implementation manners, the base station controller, to which the first cell belongs, uses a neighboring cell list of the first cell to carry the ID information of the sharing PLMN of the second cell or the indication information indicating whether the second cell is a shared cell, and sends the neighboring cell list to the mobile terminal. It should be noted that in this manner, the specific cell to which the mobile terminal hands over is not determined, and the second cell refers to any neighboring cell of the first cell. In addition, in this implementation manner, the ID information of sharing PLMNs of all neighboring cells of the first cell, or the indication information indicating whether the neighboring cells are shared cells, may be preconfigured in the base station controller to which the first cell belongs, and periodically sent to the mobile terminal in the first cell.

In some implementation manners, according to a measurement report that is normally reported by the mobile terminal, the base station controller, to which the first cell belongs, finds that the mobile terminal is about to hand over from the first cell to the second cell, and uses dedicated signaling to send the ID information of the sharing PLMN of the second cell or the indication information indicating whether the second cell is a shared cell to the mobile terminal. It should be noted that in this manner, the specific cell to which the mobile terminal hands over is actually determined, and the second cell refers to the cell to which the mobile terminal hands over. In this implementation manner, the ID information of sharing PLMNs of all neighboring cells of the first cell, or the indication information indicating whether the neighboring cells are shared cells, is not necessarily preconfigured in the base station controller to which the first cell belongs, and it is only necessary to, when determining the second cell to which the mobile terminal will hand over, obtain PLMN sharing information of the second cell from the base station controller to which the second cell belongs, and use dedicated signaling to send the PLMN sharing information to the mobile terminal. Alternatively, according to whether the PLMN sharing information is obtained, the indication information indicating whether the second cell is a shared cell is sent to the mobile terminal by using the dedicated signaling.

Step S22: When the mobile terminal is about to hand over from the first cell to the neighboring second cell, the mobile terminal selects, according to the ID information of the sharing PLMN of the second cell or the indication information indicating whether the second cell is a shared cell, a preferred PLMN after handover to the second cell, where the ID information or the indication information is received in step S21.

The selecting, according to the ID information of the sharing PLMN of the second cell or the indication information indicating whether the second cell is a shared cell, a preferred PLMN after handover to the second cell includes:

if the ID information of the sharing PLMN of the second cell is received, selecting, by the mobile terminal, a home PLMN directly according to subscription attribute information; or, detecting, by the mobile terminal, whether the home PLMN is one sharing PLMN of the second cell, that is, first determining whether the second cell is shared by the home PLMN, and then, if the second cell is shared by the home PLMN, selecting the home PLMN as the preferred PLMN after handover to the second cell, or, if the second cell is not shared by the home PLMN, selecting a PLMN related to the home PLMN, for example, selecting a PLMN that has subscribed a tariff preference policy with the home PLMN, as the preferred PLMN; or if the indication information indicating whether the second cell is a shared cell is received, directly using, by the mobile terminal, the home PLMN as the preferred PLMN.

It should be noted that, if the indication information indicating whether the second cell is not a shared cell is received, the mobile terminal does not perform PLMN selection.

Step S23: Send the identifier ID information of the preferred PLMN to the base station controller to which the first cell belongs.

Step S23 is the same as step S12 in FIG. 1, and is not repeated here any further.

In this embodiment, ID information of a sharing PLMN of a second cell, or indication information indicating whether the second cell is a shared cell, is conveyed to a mobile terminal by using a base station controller to which a first cell belongs, so that the mobile terminal can select an appropriately preferred PLMN according to sharing conditions of the second cell and send the preferred PLMN to the base station controller to which the first cell belongs.

Figure 3:
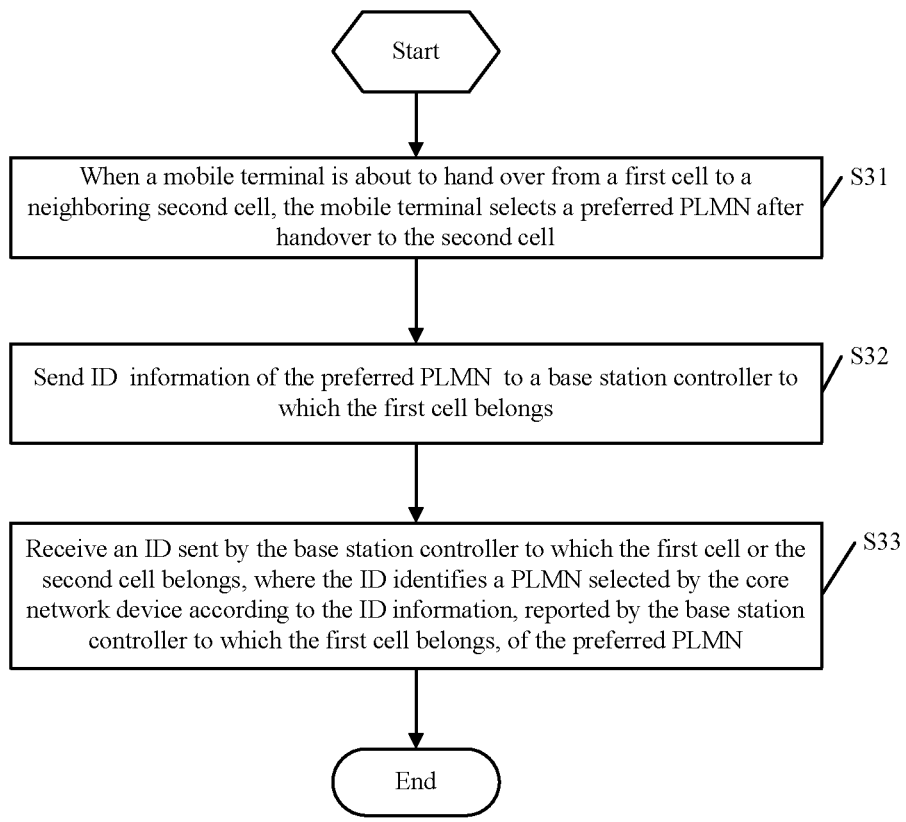
FIG. 3 is a schematic flowchart of a third embodiment of a PLMN selection method according to the present invention.

Refer to FIG. 3, which is a schematic flowchart of a third embodiment of a PLMN selection method according to the present invention. A method process shown in FIG. 3 may be performed by a mobile terminal. The method process shown in FIG. 3 includes the following steps:

Step S31: When the mobile terminal is about to hand over from a first cell to a neighboring second cell, the mobile terminal selects a preferred PLMN after handover to the second cell.

Step S32: Send ID (Identity, identifier) information of the preferred PLMN to a base station controller to which the first cell belongs.

Steps S31 to S32 are the same as steps S11 to S12 in FIG. 1, and are not repeated here any further.

Step S33: Receive an ID sent by the base station controller to which the first cell or the second cell belongs, where the ID identifies a PLMN selected by a core network device according to the ID information, reported by the base station controller to which the first cell belongs, of the preferred PLMN.

The first cell may notify the mobile terminal of the ID received in step S33 by using a handover command such as a HO Command or a PS HO Command. The ID may also be carried in a Channel Release (channel release) message sent by the first cell when the mobile terminal creates a connection both with the first cell and the second cell in a process of handover, where the Channel Release is used to instruct the mobile terminal to release a link from the first cell; or, the ID may be carried in a dedicated message such as Measurement Information sent by the first cell after completion of the handover. Surely, the ID received in step S33 may also be directly sent to the mobile terminal when the ID is received by the base station controller to which the second cell belongs.

It should be noted that the PLMN identified by the ID received here is a PLMN selected by the core network device according to the ID information, reported by the base station controller to which the first cell belongs, of the preferred PLMN, and therefore, the PLMN identified by the ID may be a preferred PLMN or not. For example, after the mobile terminal reports the preferred PLMN, the core network device finds that the second cell is not shared by the preferred PLMN at all, and reselects a PLMN for the mobile terminal. In this case, the PLMN identified by the received ID is obviously not a preferred PLMN.

Further, after receiving the ID, the mobile terminal may determine, according to the ID, whether to initiate a route update process, and may initiate the route update process when necessary. It should be noted that this process is apparent to persons skilled in the art and is not repeated here any further.

In this embodiment, an ID of a PLMN to which a mobile terminal ultimately needs to hand over is sent to the mobile terminal, so that the mobile terminal can subsequently initiate a normal route update process.

Figure 4:
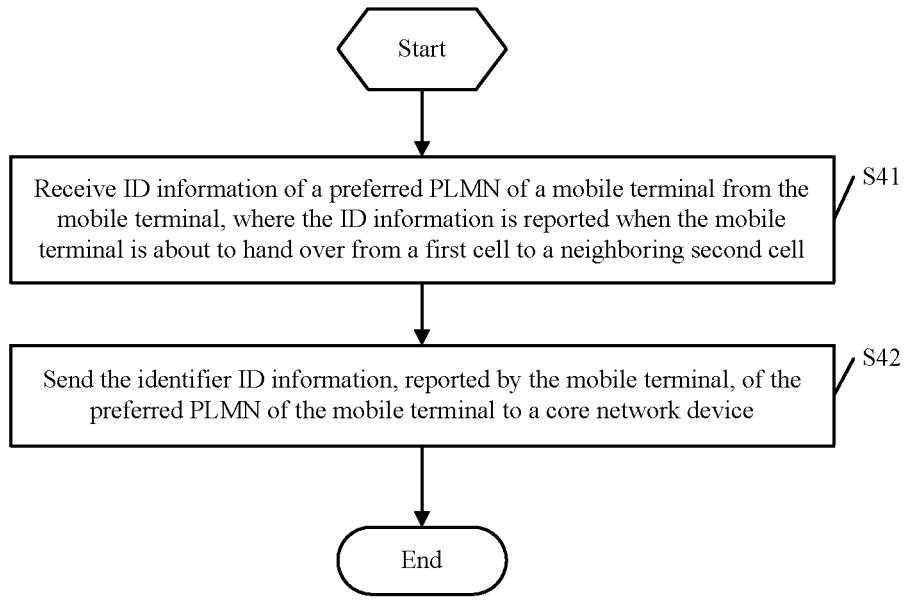
FIG. 4 is a schematic flowchart of a fourth embodiment of a PLMN selection method according to the present invention.

Refer to FIG. 4, which is a schematic flowchart of a fourth embodiment of a PLMN selection method according to the present invention. A method process in FIG. 4 may be performed by a base station controller, that is, the base station controller to which a first cell belongs as mentioned in the method process shown in FIG. 1 to FIG. 3. The method process shown in FIG. 4 includes the following steps:

Step S41: Receive ID information of a preferred PLMN of a mobile terminal, where the ID information is reported when the mobile terminal is about to hand over from a first cell to a neighboring second cell.

The ID information of the preferred PLMN in step S41 may be carried in a measurement report reported by the mobile terminal, and the base station controller may obtain the ID information of the preferred PLMN of the mobile terminal from the measurement report reported by the mobile terminal.

Further, before step S41, the following may be included: sending, to the mobile terminal, ID information of a sharing PLMN of the second cell or indication information indicating whether the second cell is a shared cell. In some implementation manners, a sent neighboring cell list may carry the ID information of the sharing PLMN of the second cell or the indication information indicating whether the second cell is a shared cell, where the ID information or the indication information is sent to the mobile terminal. In this case, it should be said that the neighboring cell list carries the ID information of sharing PLMNs of all neighboring cells of the first cell or indication information indicating whether the neighboring cells are shared cells. In some implementation manners, the ID information of the sharing PLMN of the second cell, or the indication information indicating whether the second cell is a shared cell, may be sent to the mobile terminal when it is determined, according to the measurement report reported by the mobile terminal, that the mobile terminal will be handed over from the first cell to the second cell.

Step S42: Send the identifier ID information, reported by the mobile terminal, of the preferred PLMN of the mobile terminal to a core network device.

In some implementation manners of step S42, the base station controller sends a handover request (HO Required or PS HO Required) to the core network device, where the handover request carries the ID information of the preferred PLMN.

Figure 5:
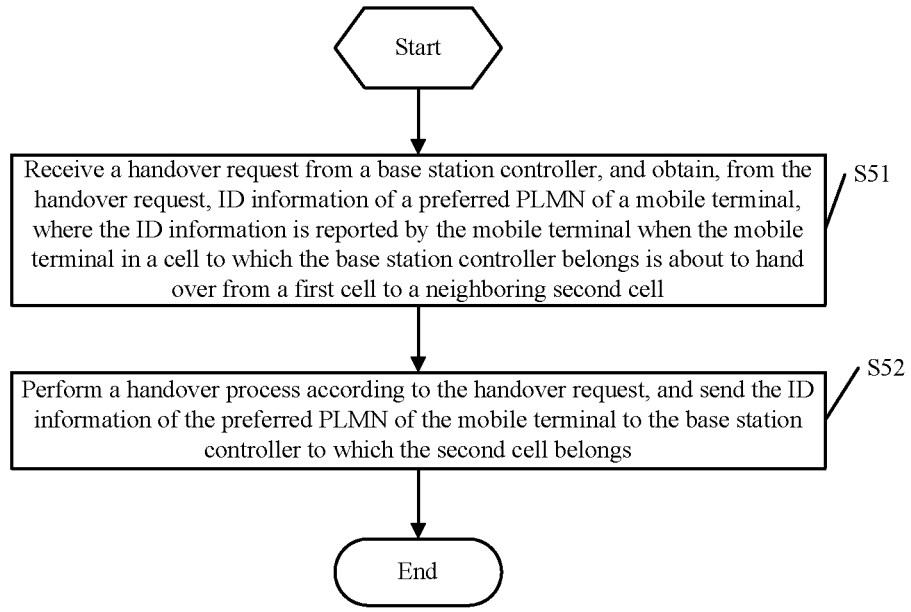
FIG. 5 is a schematic flowchart of a fifth embodiment of a PLMN selection method according to the present invention.

Refer to FIG. 5, which is a schematic flowchart of a fifth embodiment of a PLMN selection method according to the present invention.

A method process shown in FIG. 5 may be performed by a core network device, such as an MSC or an SGSN. The method process shown in FIG. 5 includes the following steps:

Step S51: Receive a handover request from a base station controller, and obtain, from the handover request, ID information of a preferred PLMN of a mobile terminal, where the ID information is reported by the mobile terminal when the mobile terminal in a cell to which the base station controller belongs is about to hand over from a first cell to a neighboring second cell.

The mobile terminal refers to the mobile terminal in the embodiments shown in FIG. 1 to FIG. 3, and the base station controller refers to the base station controller in the embodiment shown in FIG. 4.

Step S52: Perform a handover process according to the handover request in step S51, and send the ID information of the preferred PLMN of the mobile terminal to a base station controller to which the second cell belongs.

In step S51, the core network device does not select a PLMN for the mobile terminal, but sends the ID information of the PLMN selected by the mobile terminal to the base station controller to which the second cell belongs, and notifies the base station controller to which the second cell belongs that when the mobile terminal hands over to the second cell, the mobile terminal will access the PLMN identified by the ID. It should be noted that before step S52, the core network device may first determine properness of the preferred PLMN of the mobile terminal.

Specifically:

The core network device determines whether the preferred PLMN of the mobile terminal can be selected as a PLMN to be accessed after the mobile terminal hands over to the second cell; and, if yes, performs step S52; if not, reselects a PLMN for the mobile terminal and then sends the PLMN to the base station controller to which the second cell belongs.

The determining, by the core network device, whether the preferred PLMN of the mobile terminal can be selected as a PLMN to be accessed after the mobile terminal hands over to the second cell primarily is: According to preconfigured PLMN sharing information of the second cell, the core network device determines whether the second cell is shared by the preferred PLMN of the mobile terminal; if yes, uses the preferred PLMN as a PLMN to be accessed after the mobile terminal hands over to the second cell; and, if not, reselects for the mobile terminal a PLMN to be accessed after handover to the second cell.

Further, the core network device further sends the ID information of the PLMN, which is ultimately accessed by the mobile terminal, to the mobile terminal. For example, the base station controller, to which the first cell belongs, sends the ID information to the mobile terminal by using a message such as a handover command, a Channel Release or a Measurement Information.

In this embodiment, when a handover process is performed according to a handover request, a core network device sends a preferred PLMN of a mobile terminal to a base station controller to which a second cell belongs. Therefore, a support for the mobile terminal to select a PLMN during handover is implemented.

Figure 6:
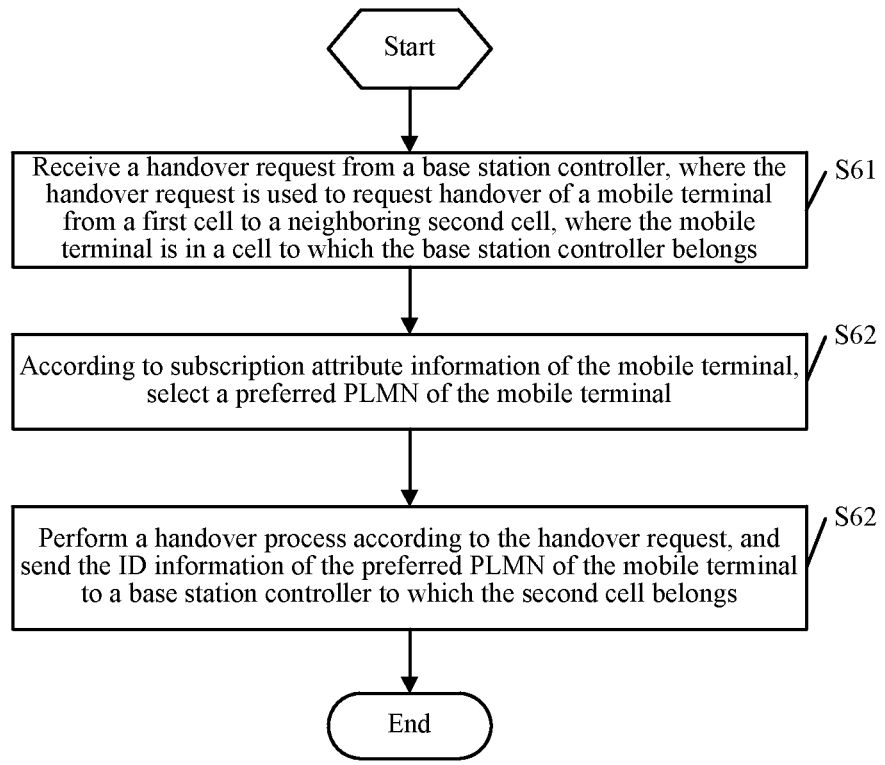
FIG. 6 is a schematic flowchart of a sixth embodiment of a PLMN selection method according to the present invention.

Refer to FIG. 6, which is a schematic flowchart of a sixth embodiment of a PLMN selection method according to the present invention. A method process shown in FIG. 6 may be performed by a core network device such as an MSC or an SGSN. The method process shown in FIG. 6 includes the following steps:

Step S61: Receive a handover request from a base station controller, where the handover request is used to request handover of a mobile terminal from a first cell to a neighboring second cell, where the mobile terminal is in a cell to which the base station controller belongs.

Further, the handover request may further carry ID information of a sharing PLMN of the neighboring second cell.

Step S62: According to subscription attribute information of the mobile terminal, select a preferred PLMN of the mobile terminal Because the core network device learns the subscription attribute information of the mobile terminal, the core network device can select the preferred PLMN for the mobile terminal according to the subscription attribute information, but does not randomly select a PLMN for the mobile terminal. Generally, the core network device obtains a home PLMN of the mobile terminal according to the subscription attribute information, and uses the home PLMN as the preferred PLMN of the mobile terminal.

Further, if the handover request in step S61 carries the ID information of the sharing PLMN of the second cell, the preferred PLMN of the mobile terminal may be selected from the sharing PLMN of the second cell according to the subscription attribute information of the mobile terminal in step S62, and an ID of the preferred PLMN may be obtained. For example, when the home PLMN of the mobile terminal is one of sharing PLMNs of the second cell, the home PLMN is directly used as the preferred PLMN of the mobile terminal; when the home PLMN of the mobile terminal is not one of the sharing PLMNs of the second cell, a PLMN highly dependent on the home PLMN in the sharing PLMNs of the second cell is used as the preferred PLMN of the mobile terminal. For example, a PLMN that has subscribed a tariff preference policy with the home PLMN of the mobile terminal.

Step S63: Perform a handover process according to the handover request, and send the ID information of the preferred PLMN of the mobile terminal to a base station controller to which the second cell belongs.

Further, the core network device may send the ID information in step S63 to the mobile terminal by using a message such as a handover request (HO Command or PS HO Command), a Channel Release or a Measurement Information, so that subsequently the mobile terminal can determine, according to the ID information, whether a normal route update process needs to be performed.

In this embodiment, a core network device selects a PLMN for a mobile terminal according to subscription attribute information of the mobile terminal, and a home PLMN is preferentially selected. Although the selection is not directly made by the mobile terminal in this embodiment, a PLMN can also properly be selected for the mobile terminal because the selection is made according to the subscription attribute information of the mobile terminal.

The following further describes embodiments of a message flow of a PLMN selection method with reference to the embodiments in FIG. 1 to FIG. 6.

Figure 7:
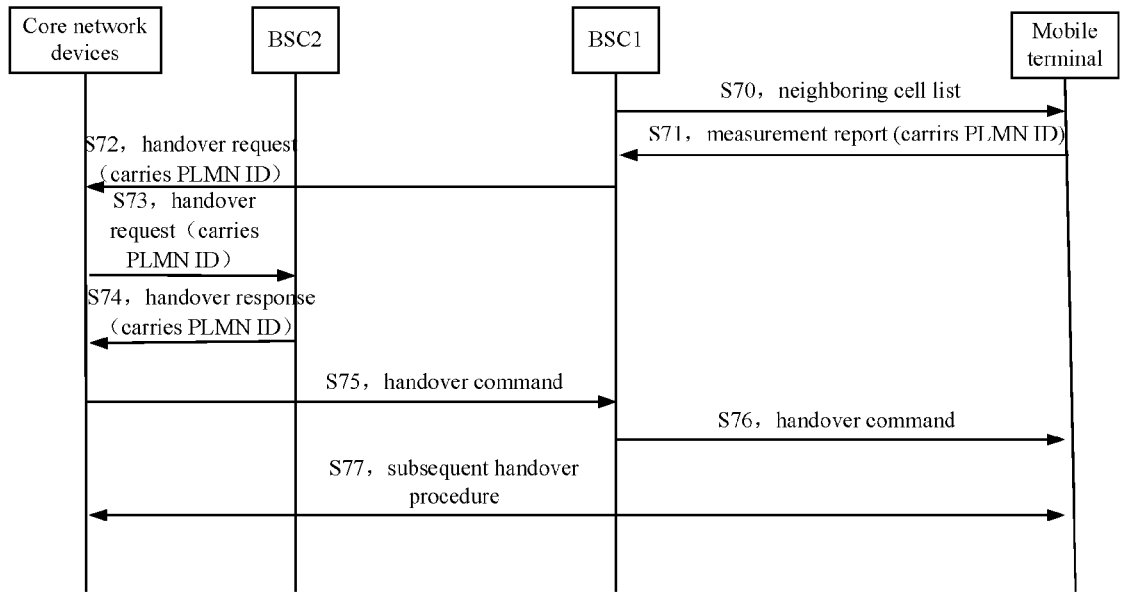
FIG. 7 is a schematic flowchart of a first embodiment of a message flow of a PLMN selection method according to the present invention.

Refer to FIG. 7, which is a schematic flowchart of a first embodiment of a message flow of a PLMN selection method according to the present invention. The message flow includes the following steps:

Step S70: A base station controller (BSC1 in the figure), to which a first cell belongs, sends a neighboring cell list.

The neighboring cell list in step S70 includes ID information of sharing PLMNs of a neighboring cell or indication information indicating whether the neighboring cell is a shared cell. The ID information of the PLMNs of the neighboring cell or the indication information indicating whether the neighboring cell is a shared cell may be preconfigured in the base station controller to which the first cell belongs.

Step S71: A mobile terminal reports a measurement report to the base station controller to which the first cell belongs.

The mobile terminal and the first cell are in a connected state. The mobile terminal measures signal strength of the neighboring cells of the first cell and generates a measurement report, where the measurement report carries ID information of the preferred PLMN of the mobile terminal when the mobile terminal hands over from the first cell to a second cell, and the second cell refers to any neighboring cell of the first cell.

Step S72: The base station controller, to which the first cell belongs, sends a handover request to a core network device, where the handover request may be a message such as an HO Required message or a PS HO Required message or the like. The handover request is used to request handover of the mobile terminal from the first cell to the second cell, and the handover request carries the ID information of the preferred PLMN after the mobile terminal hands over to the second cell.

Step S73: The core network device sends a handover request to the base station controller (BSC2 in the diagram) to which the second cell belongs, where the handover request carries the ID information of the preferred PLMN of the mobile terminal.

Step S74: The base station controller, to which the second cell belongs, returns a handover response to the core network device.

Step S75: The core network device sends a handover command to the base station controller to which the first cell belongs.

Step S76: The base station controller, to which the first cell belongs, forwards the handover command to the mobile terminal.

Step S77: Handover process.

It should be noted that in steps S75 to S77, the core network device may use the handover command in S75 to send the ID information of the PLMN to be ultimately accessed by the mobile terminal to the mobile terminal. Alternatively, the ID information of the PLMN to be ultimately accessed by the mobile terminal is sent to the mobile terminal by using a Channel Release message in the handover process or a Measurement Information message after the handover is complete.

Figure 8:
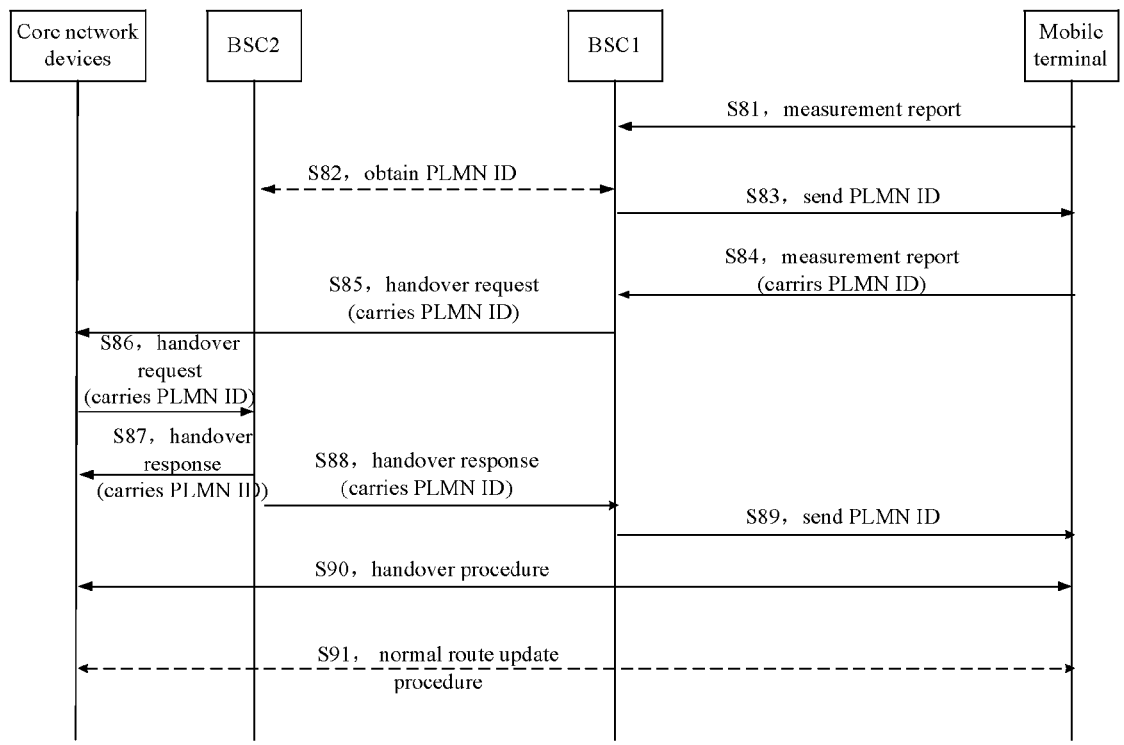
FIG. 8 is a schematic flowchart of a second embodiment of a message flow of a PLMN selection method according to the present invention.

Refer to FIG. 8, which is a schematic flowchart of a second embodiment of a message flow of a PLMN selection method according to the present invention. The message flow shown in FIG. 8 includes the following steps:

Step S81: A mobile terminal reports a measurement report to a base station controller to which a first cell belongs.

Step S82: The base station controller, to which the first cell belongs, obtains ID information of a sharing PLMN of a second cell from a base station controller to which the second cell belongs.

Specifically, the base station controller, to which the first cell belongs, performs a handover decision according to a measurement report, and decides to hand over the mobile terminal from the first cell to the second cell, and obtains the ID information of the sharing PLMN of the second cell from the base station controller to which the second cell belongs.

Step S83: The base station controller, to which the first cell belongs, sends the obtained ID information of the sharing PLMN to the mobile terminal.

Step S84: The mobile terminal sends a measurement report to the base station controller to which the first cell belongs, where the measurement report carries the ID information of the preferred PLMN of the mobile terminal for handover to the second cell.

Step S85: The base station controller, to which the first cell belongs, sends a handover request to a core network device, where the handover request carries the ID information of the preferred PLMN of the mobile terminal.

Step S86: The core network device sends, to the base station controller to which the second cell belongs, the handover request that carries the ID information of the preferred PLMN of the mobile terminal.

Step S87: The base station controller, to which the second cell belongs, feeds back a handover response to the core network device, where the handover response may carry the ID information of the preferred PLMN of the mobile terminal.

Step S88: The base station controller, to which the second cell belongs, sends a handover response that carries the PLMN ID to the base station controller to which the first cell belongs.

Step S89: The base station controller, to which the first cell belongs, sends the PLMN ID to the mobile terminal.

Step S90: Handover process.

Step S91: Route update process.

Figure 9:
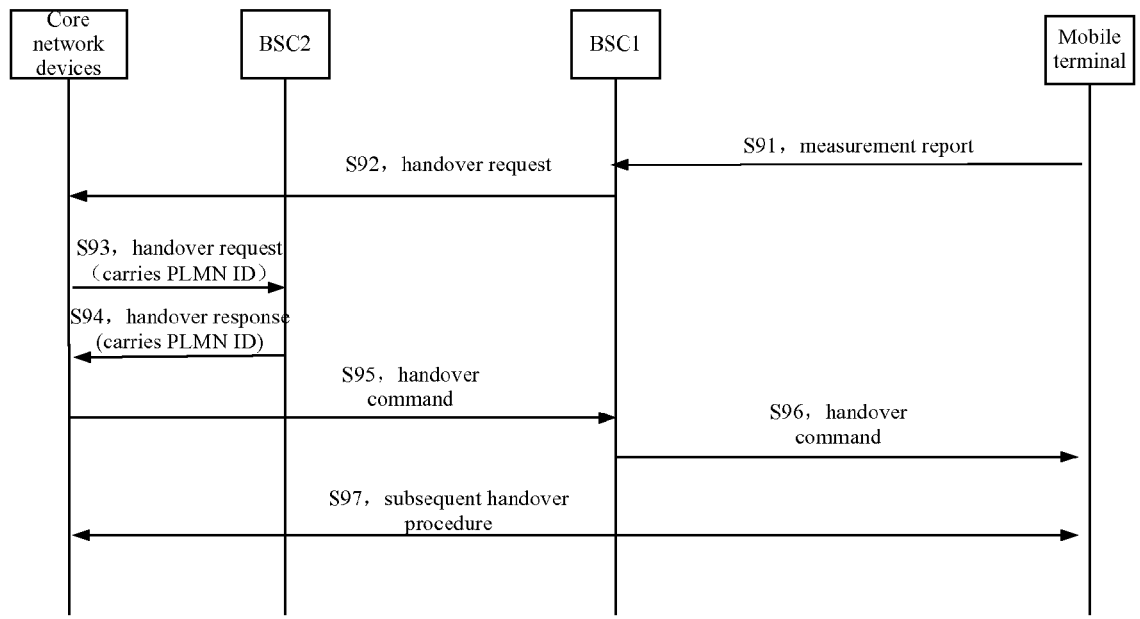
FIG. 9 is a schematic flowchart of a third embodiment of a message flow of a PLMN selection method according to the present invention.

Refer to FIG. 9, which is a schematic flowchart of a third embodiment of a message flow of a PLMN selection method according to the present invention. The message flow shown in FIG. 9 includes the following steps:

Step S91: A mobile terminal reports a measurement report to a base station controller to which a first cell belongs.

Step S92: The base station controller, to which the first cell belongs, sends a handover request to a core network device to request handover of the mobile terminal from the first cell to a second cell.

Step S93: The core network device selects a preferred PLMN for the mobile terminal according to subscription attribute information of the mobile terminal, uses a handover request to carry an ID of the preferred PLMN, and sends the handover request to a base station controller to which the second cell belongs.

Step S94: The second cell feeds back a handover response that carries the PLMN ID to the core network device.

Step S95: The core network device sends a handover command to the base station controller to which the first cell belongs.

Step S96: The base station controller, to which the first cell belongs, sends the handover command to the mobile terminal.

Step S97: Subsequent handover process.

The following describes apparatus embodiments corresponding to the method processes shown in FIG. 1 to FIG. 6.

Figure 10:
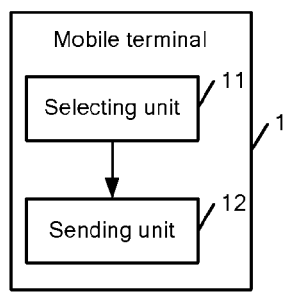
FIG. 10 is a schematic structural diagram of a first embodiment of a mobile terminal according to the present invention.

Refer to FIG. 10, which is a schematic structural diagram of a first embodiment of a mobile terminal according to the present invention. The mobile terminal 1 includes:

A selecting unit 11 is configured to: when the mobile terminal is about to hand over from a first cell to a neighboring second cell, select a preferred PLMN after handover to the second cell.

The first cell is a cell to which the mobile terminal currently belongs, and the second cell is a neighboring cell of the first cell. When the mobile terminal already learns that the second cell is a shared cell or is uncertain whether the second cell is a shared cell, where the shared cell refers to a cell shared by multiple PLMNs, the selecting unit 11 performs the operation of selecting a preferred PLMN after handover to the second cell.

The preferred PLMN of the mobile terminal may be a home PLMN of the mobile terminal, which is determined by subscription attribute information of the mobile terminal. For example, if the mobile terminal is subscribed to China Mobile, the home PLMN of the mobile terminal is China Mobile. Surely, the preferred PLMN of the mobile terminal may also be a PLMN that is highly dependent on the home PLMN, for example, a PLMN that offers a tariff preference policy. In some implementation manners, assuming that the home PLMN of the mobile terminal is China Mobile but no network signal of China Mobile is available in a current location of the mobile terminal, if the mobile terminal finds that, according to network use records, a Vodafone network is used by the mobile terminal last time and for the last time but one, then the mobile terminal may consider that in this region, Vodafone is a PLMN that is highly dependent on China Mobile, and therefore, the mobile terminal uses Vodafone as a preferred PLMN.

The mobile terminal is in a connected state, for example, works in a Dedicated/Packet Transfer/Dual Transfer mode.

A sending unit 12 is configured to send ID (Identity, identifier) information of the preferred PLMN selected by the selecting unit 11 to a base station controller to which the first cell belongs.

In some implementation manners, the ID information of the preferred PLMN is carried in a measurement report, which is sent by the sending unit 12 to the base station controller to which the first cell belongs. The measurement report is an important basis for the base station controller to perform a handover decision. Generally, a mobile terminal at a cell edge measures signal strength of a neighboring cell and generates a measurement report, and sends the measurement report to a base station controller to which the corresponding cell belongs. After receiving the measurement report, the base station controller performs a handover decision to determine whether the mobile terminal remains in this cell or hands over to another cell so that the another cell provides services for the mobile terminal. For example, the mobile terminal measures signal strength of neighboring cells of the first cell, that is, a second cell and a third cell, and generates a measurement report, and selects a preferred PLMN if the mobile terminal hands over to the second cell and a preferred PLMN if the mobile terminal hands over to the third cell; and then carries the preferred PLMN in the measurement report and sends the measurement report to the base station controller to which the first cell belongs.

In this embodiment of the present invention, when a mobile terminal is about to hand over from a first cell to a neighboring second cell, the mobile terminal selects a PLMN, and sends ID information of the selected PLMN to a base station controller to which the first cell belongs. In this way, the mobile terminal selecting a PLMN is implemented. Because the PLMN is selected by the mobile terminal, it can be avoided that when the mobile terminal is in a connected state, the core network device hands over the mobile terminal to an inappropriate PLMN, and proper of PLMN selection is improved.

Figure 11:
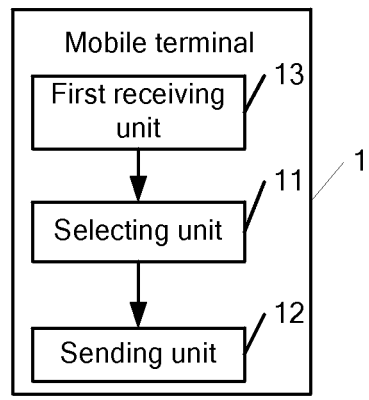
FIG. 11 is a schematic structural diagram of a second embodiment of a mobile terminal according to the present invention.

Refer to FIG. 11, which is a schematic structural diagram of a second embodiment of a mobile terminal according to the present invention. The mobile terminal 1 includes:

a first receiving unit 10 is configured to receive ID information of a sharing PLMN of a second cell (when the second cell is a shared cell) or indication information indicating whether the second cell is a shared cell, where the ID information or the indication information is sent by a base station controller to which a first cell belongs.

In some implementation manners, the base station controller, to which the first cell belongs, uses a neighboring cell list of the first cell to carry the ID information of the sharing PLMN of the second cell or the indication information indicating whether the second cell is a shared cell, and sends the neighboring cell list to the mobile terminal. It should be noted that in this manner, the specific cell to which the mobile terminal hands over is not determined, and the second cell refers to any neighboring cell of the first cell. In addition, in this implementation manner, the ID information of sharing PLMNs of all neighboring cells of the first cell, or the indication information indicating whether the neighboring cells are shared cells, may be preconfigured in the base station controller to which the first cell belongs, and periodically sent to the mobile terminal in the first cell.

In some implementation manners, according to a measurement report that is normally reported by the mobile terminal, the base station controller, to which the first cell belongs, finds that the mobile terminal is about to hand over from the first cell to the second cell, and uses dedicated signaling to send the ID information of the sharing PLMN of the second cell or the indication information indicating whether the second cell is a shared cell to the mobile terminal. It should be noted that in this manner, the specific cell to which the mobile terminal hands over is actually determined, and the second cell refers to the cell to which the mobile terminal hands over. In this implementation manner, the ID information of sharing PLMNs of all neighboring cells of the first cell, or the indication information indicating whether the neighboring cells are shared cells, is not necessarily preconfigured in the base station controller to which the first cell belongs, and it is only necessary to, when determining the second cell to which the mobile terminal will hand over, obtain PLMN sharing information of the second cell from the base station controller to which the second cell belongs, and use dedicated signaling to send the PLMN sharing information to the mobile terminal. Alternatively, according to whether the PLMN sharing information is obtained, the indication information indicating whether the second cell is a shared cell is sent to the mobile terminal by using the dedicated signaling.

A selecting unit 11 is further configured to: when the mobile terminal is about to hand over from the first cell to the neighboring second cell, select, according to the ID information of the sharing PLMN of the second cell or the indication information indicating whether the second cell is a shared cell, a preferred PLMN after handover to the second cell, where the ID information or the indication information is received by the receiving unit 10.

The selecting, by the selecting unit 11 according to the ID information of the sharing PLMN of the second cell or the indication information indicating whether the second cell is a shared cell, a preferred PLMN after handover to the second cell includes:

if the ID information of the sharing PLMN of the second cell is received, selecting, by the selecting unit 11, a home PLMN directly according to subscription attribute information; or, detecting, by the selecting unit 11, whether the home PLMN is one sharing PLMN of the second cell, that is, first determining whether the second cell is shared by the home PLMN, and then, if the second cell is shared by the home PLMN, selecting the home PLMN as the preferred PLMN after handover to the second cell, or, if the second cell is not shared by the home PLMN, selecting a PLMN related to the home PLMN, for example, a PLMN that has subscribed a tariff preference policy with the home PLMN, as the preferred PLMN; or if the indication information indicating whether the second cell is a shared cell is received, directly using, by the selecting unit 11, the home PLMN as the preferred PLMN.

It should be noted that, if the indication information indicating whether the second cell is not a shared cell is received, the selecting unit 11 does not perform PLMN selection.

a sending unit 12, configured to send the identifier ID information of the preferred PLMN to the base station controller to which the first cell belongs.

In this embodiment, ID information of a sharing PLMN of a second cell, or indication information indicating whether the second cell is a shared cell, is conveyed to a mobile terminal by using a base station controller to which a first cell belongs, so that the mobile terminal can select an appropriately preferred PLMN according to sharing conditions of the second cell and send the preferred PLMN to the base station controller to which the first cell belongs.

Figure 12:
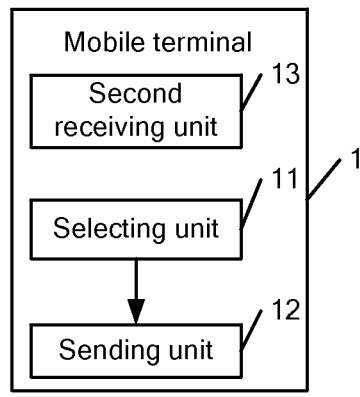
FIG. 12 is a schematic structural diagram of a third embodiment of a mobile terminal according to the present invention.

Refer to FIG. 12, which is a schematic flowchart of a third embodiment of a mobile terminal according to the present invention. The mobile terminal 1 includes:

a selecting unit 11, configured to: when the mobile terminal is about to hand over from a first cell to a neighboring second cell, select a preferred PLMN after handover to the second cell;

a sending unit 12, configured to send ID (Identity, identifier) information of the preferred PLMN selected by the selecting unit 11 to a base station controller to which the first cell belongs; and a second receiving unit 13, configured to receive an ID sent by the base station controller to which the first cell or the second cell belongs, where the ID identifies a PLMN selected by a core network device according to the ID information, reported by the base station controller to which the first cell belongs, of the preferred PLMN.

The first cell may notify the mobile terminal of the ID received by the second receiving unit 13 by using a handover command such as a HO Command or a PS HO Command. The ID may also be carried in a Channel Release (channel release) message sent by the first cell when the mobile terminal creates a connection both with the first cell and the second cell in a process of handover, where the Channel Release is used to instruct the mobile terminal to release a link from the first cell; or, the ID may be carried in a dedicated message such as Measurement Information sent by the first cell after completion of the handover. Surely, the ID received by the second receiving unit 13 may also be directly sent to the mobile terminal when the ID is received by the base station controller to which the second cell belongs.

It should be noted that the PLMN identified by the ID received by the second receiving unit 13 is a PLMN selected by the core network device according to the ID information, reported by the base station controller to which the first cell belongs, of the preferred PLMN, and therefore, the PLMN identified by the ID may be a preferred PLMN or not. For example, after the mobile terminal reports the preferred PLMN, the core network device finds that the second cell is not shared by the preferred PLMN at all, and reselects a PLMN for the mobile terminal. In this case, the PLMN identified by the received ID is obviously not a preferred PLMN.

Further, after the second receiving unit 13 receives the ID, the mobile terminal may determine, according to the ID, whether to initiate a route update process, and may initiate the route update process when necessary. It should be noted that this process is apparent to persons skilled in the art and is not repeated here any further.

In this embodiment, an ID of a PLMN to which a mobile terminal ultimately needs to hand over is sent to the mobile terminal, so that the mobile terminal can subsequently initiate a normal route update process.

Figure 13:
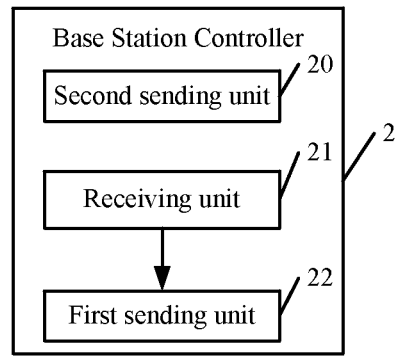
FIG. 13 is a schematic structural diagram of an embodiment of a base station controller according to the present invention.

Refer to FIG. 13, which is a schematic structural diagram of an embodiment of a base station controller according to the present invention. The base station controller 2 includes:

a receiving unit 21, configured to: receive ID information of a preferred PLMN of a mobile terminal, where the ID information is reported when the mobile terminal is about to hand over from a first cell to a neighboring second cell, where, the ID information of the preferred PLMN may be carried in a measurement report reported by the mobile terminal, and the base station controller may obtain the ID information of the preferred PLMN of the mobile terminal from the measurement report reported by the mobile terminal; and a first sending unit 22, configured to send the identifier ID information, reported by the mobile terminal, of the preferred PLMN of the mobile terminal, to a core network device, where, in some implementation manners of the sending unit 22, the sending unit 22 sends a handover request (HO Required or PS HO Required) to the core network device, where the handover request carries the ID information of the preferred PLMN; and in some implementation manners of the sending unit 22, the sending unit 22 sends a handover request to the core network device first, and then immediately send the ID information of the preferred PLMN to the core network device.

Further, the base station controller 2 further includes a second sending unit 20, configured to send ID information of a sharing PLMN of the second cell or indication information indicating whether the second cell is a shared cell to the mobile terminal. In some implementation manners, a sent neighboring cell list may carry the ID information of the sharing PLMN of the second cell or the indication information indicating whether the second cell is a shared cell, where the ID information or the indication information is sent to the mobile terminal. In this case, it should be said that the neighboring cell list carries the ID information of sharing PLMNs of all neighboring cells of the first cell or indication information indicating whether the neighboring cells are shared cells. In some implementation manners, the ID information of the sharing PLMN of the second cell, or the indication information indicating whether the second cell is a shared cell, may be sent to the mobile terminal when it is determined, according to the measurement report reported by the mobile terminal, that the mobile terminal will be handed over from the first cell to the second cell.

Figure 14:
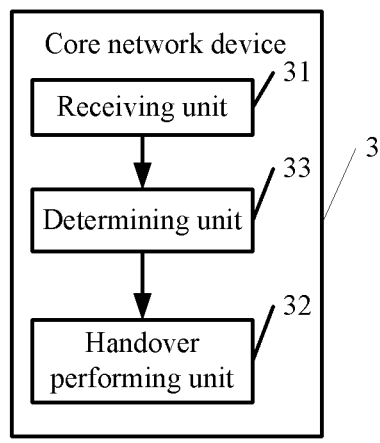
FIG. 14 is a schematic structural diagram of a first embodiment of a core network device according to the present invention.
Figure 15:
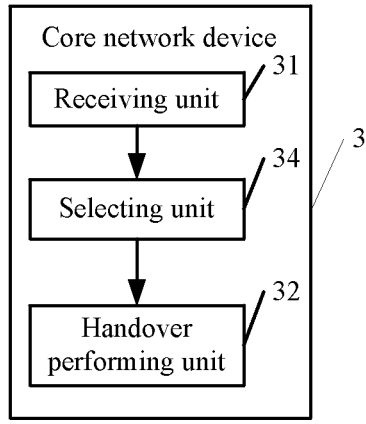
FIG. 15 is a schematic structural diagram of a second embodiment of a core network device according to the present invention.

Refer to FIG. 14, which is a schematic structural diagram of a first embodiment of a core network device according to the present invention. The core network device 3 may be an MSC or an SGSN, and includes:

a receiving unit 31, configured to receive a handover request from a base station controller, and obtain, from the handover request, ID information of a preferred PLMN of a mobile terminal, where the ID information is reported by the mobile terminal when the mobile terminal in a cell to which the base station controller belongs is about to hand over from a first cell to a neighboring second cell; and a handover performing unit 32, configured to perform a handover process according to the handover request, and send the ID information of the preferred PLMN of the mobile terminal to a base station controller to which the second cell belongs.

The core network device 3 does not select a PLMN for the mobile terminal, but uses the handover performing unit 32 to send the ID information of the PLMN selected by the mobile terminal to the base station controller to which the second cell belongs, and notifies the base station controller to which the second cell belongs that when the mobile terminal hands over to the second cell, the mobile terminal will access the PLMN identified by the ID. It should be noted that before the handover performing unit 32 performs handover, the following may be included:

a determining unit 33, configured to determine whether the preferred PLMN of the mobile terminal can be selected as a PLMN to be accessed after the mobile terminal hands over to the second cell; and, if yes, instruct the handover performing unit 32 to perform a handover process according to the handover request and to send the identifier ID information of the preferred PLMN of the mobile terminal to a base station controller to which the neighboring cell belongs.

The determining, by the determining unit 33, whether the preferred PLMN of the mobile terminal can be selected as a PLMN to be accessed after the mobile terminal hands over to the second cell, primarily is: According to preconfigured PLMN sharing information of the second cell, the determining unit 33 determines whether the second cell is shared by the preferred PLMN of the mobile terminal; if yes, the core network device 3 uses the preferred PLMN as a PLMN to be accessed after the mobile terminal hands over to the second cell; if no, the core network device 3 reselects for the mobile terminal a PLMN to be accessed after handover to the second cell.

Further, the core network device 3 further uses the handover performing unit 32 to send the ID information of the PLMN, which is be ultimately accessed by the mobile terminal, to the mobile terminal. For example, the base station controller, to which the first cell belongs, sends the ID information to the mobile terminal by using a handover command or a message such as, a Channel Release message or a Measurement Information message.

In this embodiment, when a handover process is performed according to a handover request, a core network device sends a preferred PLMN of a mobile terminal to a base station controller to which a second cell belongs. Therefore, a support for the mobile terminal to select a PLMN during handover is implemented.

Refer to FIG. 14, which is a schematic structural diagram of a second embodiment of a core network device according to the present invention. The core network device 3 includes:

A receiving unit 31 is configured to receive a handover request from a base station controller, where the handover request is used to request handover of a mobile terminal from a first cell to a neighboring second cell, where the mobile terminal is in a cell to which the base station controller belongs.

Further, the handover request may further carry ID information of a sharing PLMN of the neighboring second cell.

A selecting unit 34 is configured to select, according to subscription attribute information of the mobile terminal, a preferred PLMN of the mobile terminal.

Because the core network device learns the subscription attribute information of the mobile terminal, the core network device can select the preferred PLMN for the mobile terminal according to the subscription attribute information, but does not randomly select a PLMN for the mobile terminal. Generally, the core network device obtains a home PLMN of the mobile terminal according to the subscription attribute information, and uses the home PLMN as the preferred PLMN of the mobile terminal.

Further, if the handover request carries the ID information of the sharing PLMN of the second cell, the selecting unit 34 may select the preferred PLMN of the mobile terminal from the sharing PLMN of the second cell according to the subscription attribute information of the mobile terminal, and obtain an ID of the preferred PLMN. For example, when the home PLMN of the mobile terminal is one sharing PLMN of the second cell, the home PLMN is directly used as the preferred PLMN of the mobile terminal; when the home PLMN of the mobile terminal is not one sharing PLMN of the second cell, a PLMN highly related to the home PLMN in the sharing PLMN of the second cell is used as the preferred PLMN of the mobile terminal. For example, a PLMN that has subscribed a tariff preference policy with the home PLMN of the mobile terminal.

A handover performing unit 32 is configured to perform a handover process according to the handover request, and send the ID information of the preferred PLMN of the mobile terminal to a base station controller to which the second cell belongs.

Further, the core network device may send the ID information in step S63 to the mobile terminal by using a message such as a handover request (HO Command or PS HO Command), a Channel Release or a Measurement Information, so that subsequently the mobile terminal can determine, according to the ID information, whether a normal route update process needs to be performed.

In this embodiment, a core network device selects a PLMN for a mobile terminal according to subscription attribute information of the mobile terminal, and a home PLMN is preferentially selected. Although the selection is not directly made by the mobile terminal in this embodiment, a PLMN can also properly be selected for the mobile terminal because the selection is made according to the subscription attribute information of the mobile terminal.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

The foregoing description merely discloses exemplary embodiments of the present invention and definitely cannot be used to limit the scope of the claims of the present invention, persons of ordinary skill in the art can understand that a full or part of the flow of implementing the embodiments, and equivalent changes made according to the claims of the present invention still fall within the scope of the present invention.

What is claimed is:

1. A Public Land Mobile Network (PLMN) selection method, comprising:
receiving, by a core network device, a handover request from a base station controller, wherein the handover request is used to request handover of a mobile terminal from a first cell to a neighboring second cell, wherein the mobile terminal is in a cell to which the base station controller belongs;
selecting, by the core network device, according to subscription attribute information of the mobile terminal, a preferred PLMN of the mobile terminal from sharing PLMNs of the second cell, comprising: when the home PLMN of the mobile terminal is one of the sharing PLMNs of the second cell, the home PLMN is directly used as the preferred PLMN of the mobile terminal; when the home PLMN of the mobile terminal is not one of the sharing PLMNs of the second cell, a PLMN that has subscribed a tariff preference policy with the home PLMN of the mobile terminal in the sharing PLMNs of the second cell is used as the preferred PLMN of the mobile terminal; and
performing, by the core network device, a handover process according to the handover request, and sending identity (ID) information of the preferred PLMN of the mobile terminal to a base station controller to which the second cell belongs.

2. The method according to claim 1, wherein the handover request further carries ID information of sharing PLMNs of the second cell;
the selecting, by the core network device, according to subscription attribute information of the mobile terminal, a preferred PLMN of the mobile terminal from sharing PLMNs of the second cell further comprises:
obtaining the ID of the preferred PLMN.

3. The method according to claim 1, the method further comprises;
sending, by the core network device, the ID information to the mobile terminal by using a message.

4. A non-transitory readable storage medium storing program code thereon for use by a core network device, the program code comprising:
instructions for receiving a handover request from a base station controller, wherein the handover request is used to request handover of a mobile terminal from a first cell to a neighboring second cell, wherein the mobile terminal is in a cell to which the base station controller belongs;
instructions for selecting, according to subscription attribute information of the mobile terminal, a preferred Public Land Mobile Network (PLMN) of the mobile terminal from sharing PLMNs of the second cell, comprising: when the home PLMN of the mobile terminal is one of the sharing PLMNs of the second cell, the home PLMN is directly used as the preferred PLMN of the mobile terminal; when the home PLMN of the mobile terminal is not one of the sharing PLMNs of the second cell, a PLMN that has subscribed a tariff preference policy with the home PLMN of the mobile terminal in the sharing PLMNs of the second cell is used as the preferred PLMN of the mobile terminal; and
instructions for performing a handover process according to the handover request received by the receiving unit, and send identity (ID) information of the preferred PLMN of the mobile terminal to a base station controller to which the second cell belongs.

5. The core network device according to claim 4, wherein the handover request further carries ID information of sharing PLMNs of the second cell; and the program code further comprising:
instructions for obtaining the ID of the preferred PLMN.

6. The core network device according to claim 4, the program code further comprises:
instructions for sending the ID information to the mobile terminal by using a message.

* * * * *